Oct. 9, 1962 B. SHERMAN 3,057,248
DISPERSION PRISM WITH NO DEVIATION
Filed April 13, 1961 2 Sheets-Sheet 1

INVENTOR.
BENNETT SHERMAN

ATTORNEY

United States Patent Office 3,057,248
Patented Oct. 9, 1962

3,057,248
DISPERSION PRISM WITH NO DEVIATION
Bennett Sherman, Forest Hills, N.Y., assignor to Barnes Engineering Company, Stamford, Conn., a corporation of Delaware
Filed Apr. 13, 1961, Ser. No. 102,844
3 Claims. (Cl. 88—1)

This invention relates to an improved dispersion prism which disperses a particular wavelength of radiation at each setting in a direction coincident with the entering radiation. In other words the prism effects dispersion with no deviation.

Dispersing prisms are used in a very large number of optical instruments such as monochromators, spectrometers and the like. Prisms have a great advantage that they can be used over an extended range of wavelengths of radiation, many octaves, without producing different orders of spectra which may overlap. The latter is a drawback to another dispersion element namely a grating. The spectrum formed by a suitable prism is limited in its extent only by the transmission of the prism material.

In spite of the many advantages of a dispersing prism it has suffered from one major drawback which is very serious in compact instruments. All dispersing single prisms which have been used hitherto have deviated the dispersed spectrum which as a result emerges at an angle to the entrance beam. This makes it impossible to produce an inline instrument unless elaborate multiple mirror systems are used which are quite undesirable as they introduce more chances for displacement of the many added elements. Therefore, for compact instruments and particularly instruments which are to be used in harsh environments, for example portable instruments to be used in the field by the military or others, it has been necessary to use gratings to effect the spectral dispersion. Such incline instruments utilizing gratings are described and claimed in the copending applications of Barnes and Collyer, Serial No. 848,297, filed October 23, 1959, now U.S. Patent No. 2,995,973, and Serial No. 3,568, filed January 20, 1960. These instruments have been successful and where the wavelength range is not too great so that higher orders of spectra can be eliminated very satisfactory instruments can be produced. However, if the wavelength range is greater the inherent drawback in instruments using gratings has rendered these instruments unsatisfactory. It is with the solution of this problem that the present invention deals. Essentially the present invention is concerned with a particular new form of prism. The rest of the optics in instruments using it are not changed and so will neither be shown in the drawings nor specifically described. The above general discussion is for the purpose, among others, of pointing out the utility and the need for the present invention in practical instruments.

The prism of the present invention may be used with any optical radiation, that is to say a radiation of wavelength sufficiently short to obey optical laws accurately. Of course, the nature of the material of which the prism is made will necessarily vary with the wavelength range of radiation with which it is to be employed because it must be transparent for the particular radiation. For use in the visible light glass prisms may be used. When it is desired to use radiations from the long wave ultraviolet into the near infrared prisms of fused silica may be employed and for other radiations other materials are suitable. In the long wave infrared germanium is a very effective optical material.

The nature of the materials to be used in different ranges of radiation are, of course, known and the proper material in each case will be selected in accordance with standard good optical practice for adequate transmission of the radiations for which the prism is to be used. However, in one respect there is a drastic limitation on the prism material. It must have at least a minimum refractive index of about 1.35 for the longest wavelength radiation encountered. The relation of refractive index of prism material to the other parameters of the prism will be discussed in greater detail below. While a minimum refractive index is a vital essential of the present invention this does not constitute a critical drawback because the vast majority of suitable prism materials have indices at least as high as the minimum. Thus, although the minimum is of extreme criticality it does not render the invention difficult to make or use and this wide leeway constitutes a practical advantage of the present invention since the prism materials in almost all cases can be chosen for optimum characteristics other than refractive index.

Essentially the prism of the present invention in cross-section is made up of two isosceles triangles base to base. It is essential that the two triangles have side legs of different lengths and hence, of course, will have different apex angles. The other two angles of the resulting quadrilateral are, of course, equal though their numerical value will vary from prism to prism. The cross-section of the prism, therefore, resembles an ordinary kite and often there will be a considerable difference in the two apex angles. The incoming light beam enters one of the long sides, is refracted, totally internally reflected from the other long side, again totally reflected from the adjacent shorter side and then from the other shorter side and finally from the side where the light beam enters. After this last reflection the beam then emerges from the opposite long side and at least one wavelength of the dispersed spectrum will show no deviation. The particular wavelength, of course, is chosen by turning the prism in a conventional manner. The range of selectable non-deviating wavelengths is, of course, not infinite and is fairly narrow when the refractive index approaches the minimum for the present invention. With higher refractive indices much broader ranges of radiation may be used.

The apex angle of the triangle with the shorter legs is also a factor in determining the range over which the prism can be used with any particular material. In general the greatest range is obtained when this apex angle is 90° and this is preferred because while useful prisms can be designed with different angles they will have smaller wavelength ranges and present no practical off-setting advantages tho permitting a very slightly smaller minimum refractive index.

The invention will be described in greater detail in conjunction with the drawings in which.

The prism has four vertices, A, B, C and D. Incident radiation is shown as entering the side AD and the incident beam as well as the undeviated wavelength is shown in solid lines. The long wavelength radiation limit is shown in dashed lines, and similarly the short wavelength limit is shown in dotted lines.

There are certain parametric angles. Thus at the vertex A the angle is considered bisected and each half angle labelled $\alpha$ and similarly vertex C is divided into two equal angles $\beta$. This bisection is effected by a diagonal line but to avoid confusion only a portion of this line adjacent to the two vertices is shown on the drawings. The next parametric angle is the critical angle of reflection $\theta$ a the various faces which is, of course, determined by the refractive index of the material. Then a further angle is φ. This angle is equal to β minus θ. Then there is an angle of reflection from the face AD for the undeviated wavelength. This is designated r. Finally there is another angle Δr which is the difference between r for the undeviated ray and for either of the longest and shortest wavelengths.

There is no single valued equation for the parametric quantities but it has been found that for any particular value of α, φ and Δr can be plotted against refractive index for the longest wavelength to be used. Were these plotted lines intersect will be found the refractive index for the particular angle α. Similarly for a given refractive index α can be determined. In practice this is best done on a simple computer.

Figure 1:
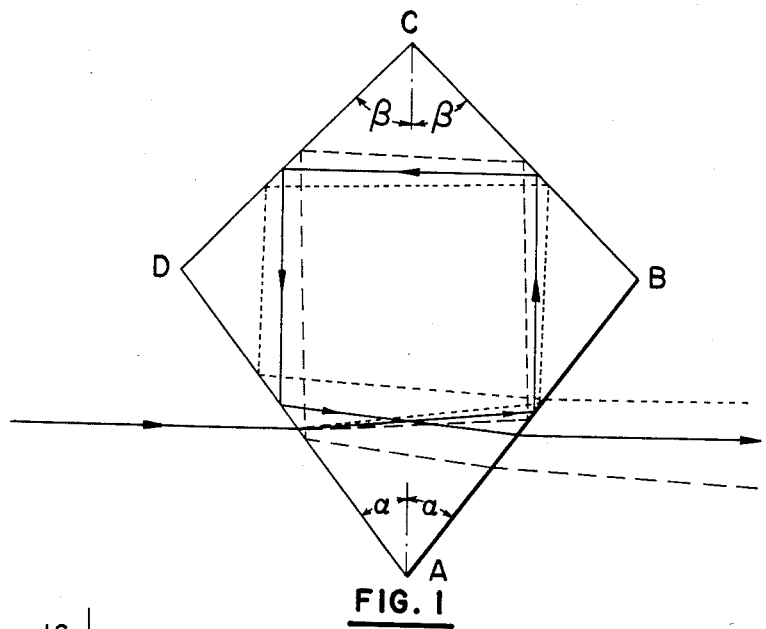
FIG. 1 is a cross-section through a prism showing the optical path of radiations going therethrough.
Figure 2:
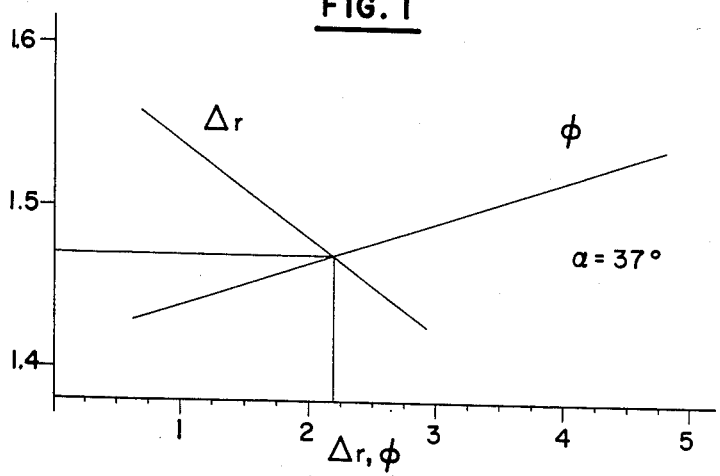
FIGS. 2 and 3 are plots of parametric angles against refractive index for prisms with two different smaller apex angles.
Figure 3:
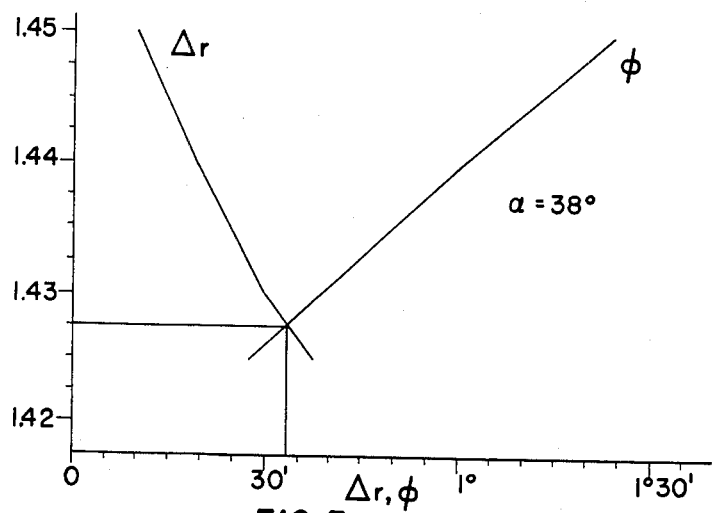

FIGS. 2 and 3 show typical plots of φ and Δr for an α of 37° and 38° respectively. The tables giving numerical values are as follows:

| α | η1 | θ | φ1 | r_AD | Δr | |
|---|---|---|---|---|---|---|
| 37° | 1.550 | 40° 10' | 4° 50' | 22° 41' | 0° 41' | |
|  | 1.500 | 41° 48' | 3° 12' | 23° 40' | 1° 40' | η1=1.470 |
|  | 1.450 | 43° 36' | 1° 24' | 24° 33' | 2° 33' | φ=2°12' |
|  | 1.430 | 44° 22' | 0° 38' | 24° 54' | 2° 54' | |
| 38° | 1.450 | 43° 36' | 1° 24' | 25° 10' | 10' | |
|  | 1.440 | 44° 00' | 1° 00' | 25° 19' | 19' | η1=1.4275 |
|  | 1.430 | 44° 22' | 0° 38' | 25° 30' | 30' | φ=0°33' |
|  | 1.425 | 44° 32' | 0° 23' | 25° 37' | 37' | |

Figure 4:
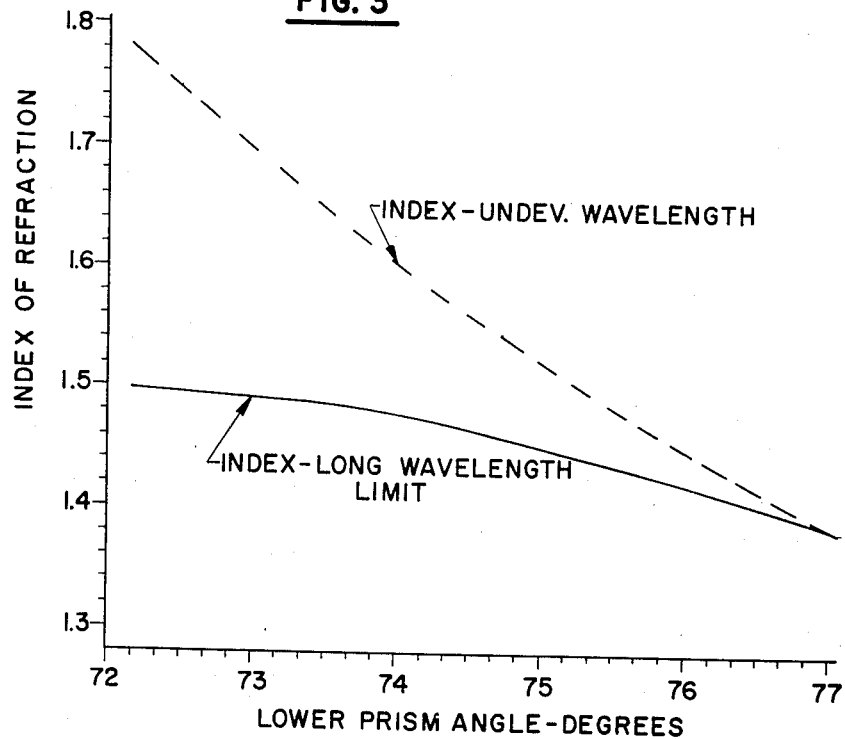
FIG. 4 is a plot of curves determining minimum refractive index.

FIG. 4 shows some plots for refractive index. It will be seen that the curves meet at a point representing the minimum refractive index in the long wave radiation. At the limit only shorter wavelengths can be used whereas for higher indices of refraction there is a wider choice of wavelength ranges. The figure is drawn for the preferred value of β, 45°. In practice the minimum possible refractive index will normally not be used or approached because it gives the least leeway in operation of the prism. It is a very definite scientific limitation and requirement of the present invention which had never hitherto been appreciated. However, in practice materials will be chosen with considerably higher refractive indices matching the refractive index of course with a suitable half apex angle α.

The typical computations set out above are for visible light using a range of refractive indices such as are encountered in common materials for prisms in this wavelength range. Other wavelength ranges, of course, will require different materials. For example, in the longer infrared germanium may be used.

The new form of prism presented by the present invention is an optical element and when incorporated into practical instruments such as monochromators, spectrometers and the like good optical practice should be followed. In the visible light if there is adequate energy the prism is used without antireflection coating on any side. With materials of extremely high refractive index such as germanium an antireflection coating may be employed for the side AD.

I claim:

1. A prism for dispersion without deviation of at least one wavelength of radiation said prism having a quadrilateral cross-section made up of two isosceles triangles of different leg length base to base, the prism being made of material with refractive index for a longest wavelength to be handled by the prism greater than 1.35, the refractive index and the apex half angles for the two triangle apices being chosen so that radiant energy of a predetermined wavelength range entering in one of the pair of long sides is refracted, totally reflected from the second long side and in turn totally reflected from each of the two short sides and finally from the first long side leaving the second long side with one wavelength of radiation undeviated from the entering radiation.

2. A prism according to claim 1 in which the half angles of the apex of the shorter length triangular portion are substantially 45° and the minimum refractive index is 1.37.

3. A prism according to claim 2 in which for a given half angle of the apex of the longer legged triangle and for a given refractive index material the difference between the angle of reflection from the first long face of the undeviated wavelength and the angle for the longest wavelength capable of undeviated dispersion is equal to 45° minus the angle of reflection at the same wavelength at the first short face.

No references cited.